United States Patent [19]

Claassen et al.

[11] Patent Number: 4,752,523
[45] Date of Patent: Jun. 21, 1988

[54] CONSOLIDATED IMPREGNATED WEB AND PROCESS

[75] Inventors: Peter J. M. W. Claassen, Al Zevenaar; Lex De Beer, Ew Didam, both of Netherlands

[73] Assignee: Polysar Financial Services S.A., Fribourg, Switzerland

[21] Appl. No.: 2,156

[22] Filed: Jan. 12, 1987

[30] Foreign Application Priority Data

Feb. 13, 1986 [NL] Netherlands .......................... 8600359

[51] Int. Cl.$^4$ .............................................. B05D 3/12
[52] U.S. Cl. .................. 428/290; 427/389.9; 524/555; 428/447; 428/904
[58] Field of Search ...................... 427/389.9; 524/555; 428/290, 441, 904

[56] References Cited

U.S. PATENT DOCUMENTS

| | | | |
|---|---|---|---|
| 3,297,623 | 1/1967 | Knapp et al. | 524/555 |
| 3,344,103 | 9/1967 | Eilbeck et al. | 524/821 |
| 3,407,164 | 10/1968 | Schmidt | 427/389.9 |
| 3,483,240 | 12/1969 | Boudreau | 556/420 |
| 3,702,315 | 11/1972 | Kuechtges et al. | 524/60 |
| 4,143,198 | 3/1979 | Sinn et al. | 428/290 |
| 4,268,595 | 5/1981 | Katagire et al. | 427/389.9 |
| 4,312,914 | 1/1982 | Guth | 427/389.9 |
| 4,448,850 | 5/1984 | Upson et al. | 427/389.9 |
| 4,474,919 | 10/1984 | Lobos et al. | 427/391 |
| 4,613,633 | 9/1986 | Sekiya et al. | 427/391 |

FOREIGN PATENT DOCUMENTS 668788 8/1963 Canada .
1520827 8/1978 United Kingdom .

OTHER PUBLICATIONS

Chemical Abstract, vol. 96, 1982, CA 96:124630g.
Chem. Abst., vol. 98, 1983, CA 98:162209g.
High Polymer Latices, D.C. Blackley, Macaren & Sons, London, 1966, vol. 6, pp. 43 and 44.

Primary Examiner—Thurman K. Page
Assistant Examiner—L. C. Horn
Attorney, Agent, or Firm—Stevens, Davis, Miller & Mosher

[57] ABSTRACT

A consolidated web may be produced by impregnating it with a compound of latex of a polymer comprising from about 10 to about 45 weight percent of a $C_{3-6}$ alkenyl nitrile; from about 36 to 85 weight percent of a $C_{4-6}$ conjugated diolefin; from about 5 to 20 weight percent of a monomer mixture comprising from 100 to about 60 percent of a $C_{8-12}$ vinyl aromatic monomer which may be unsubstituted or substituted by a $C_{1-4}$ alkenyl radical or a chlorine or bromine atom; from 0 to 40 weight percent of a $C_{1-2}$ alkyl ester of acrylic or methacrylic acid; from about 0.5 to 10 weight percent of at least one, $C_{3-6}$ ethylenically unsaturated carboxylic acid; and from about 0.1 to 5 weight percent of an N-$C_{1-4}$ alkylol derivative of an amide of a $C_{3-6}$ ethylenically unsaturated carboxylic acid; from 40–100 parts by weight of a filler, an effective amount of a gelling agent and optionally a cure paste.

7 Claims, No Drawings

CONSOLIDATED IMPREGNATED WEB AND PROCESS

BACKGROUND OF THE INVENTION

This invention relates to the manufacture of a consolidated web. More particularly the present invention relates to the manufacture of a consolidated web by impregnating a web with a heat sensitive latex and heating the impregnated web to gel the latex. The resulting webs are useful in a number of applications including the manufacture of synthetic leather and relatively strong sheet material.

It is known to manufacture consolidated sheet material by impregnating a non woven web with a compound of a latex. The compound is gelled and then the consolidated web is dried and cured. Representative of such art are British Pat. No. 1,520,827 published Aug. 9, 1978 in the name of the B. F. Goodrich Company; Canadian Pat. No. 668,788 issued Aug. 20, 1963 to Farbenfabriken Bayer A.G. and U.S. Pat. No. 4,143,198 issued Mar. 6, 1979 to Bayer A.G. These patents are restricted to the impregnation of a fibrous web with a latex compound which contains a curing agent. The compound does not contain any filler. For the manufacture of impregnated webs these drawbacks are undesirable as they require the compounding of a vulcanizing agent and at best an extremely limited use of filler. Synthetic leather prepared with latices which are currently available suffer a decrease in abrasion resistance with increasing filler levels. The present invention seeks to overcome these limitations. The latices of the present invention are self curing and accept from about 40 to 100, preferably from 50 to 70 parts by weight of a filler without a significant reduction in properties, even in the absence of cure paste.

SUMMARY OF THE INVENTION

Accordingly, the present invention provides a latex containing from about 45 to 60 weight percent of a polymer comprising
  from about 10 to about 45 weight percent of a $C_{3-6}$ alkenyl nitrile;
  from about 36 to 85 weight percent of a $C_{4-6}$ conjugated diolefin;
  from about 5 to 20 weight percent of a monomer mixture comprising from 100 to about 60 percent of a $C_{8-12}$ vinyl aromatic monomer which may be unsubstituted or substituted by a $C_{1-4}$ alkenyl radical or a chlorine or bromine atom; from 0 to 40 weight percent of a $C_{1-2}$ alkyl ester of acrylic or methacrylic acid; from about 0.5 to 10 weight percent of at least one, $C_{3-6}$ ethylenically unsaturated carboxylic acid and from about 0.1 to 5 weight percent of an N-$C_{1-4}$ alkylol derivative of an amide of a $C_{3-6}$ ethylenically unsaturated carboxylic acid; characterized in that a 0.2 to 0.3 mm thick film of a compound consisting essentially of 60 parts by weight of a particulate mineral filler and 100 parts by weight of said polymer has a tensile strength of not less than about 65 $kg/cm^2$.

The present invention also provides a method for the manufacture of a consolidated sheet material comprising impregnating a non woven fibrous web with from about 30 to 150 weight percent of the web of compound of a latex of a synthetic polymer and gelling and curing the compound, the improvement characterized in that the compound comprises a latex containing from about 50 to about 65 weight percent of a polymer of:
  from about 10 to about 45 weight percent of a $C_{3-6}$ alkenyl nitrile;
  from about 36 to about 85 weight percent of a $C_{4-6}$ conjugated diolefin;
  from about 5 to about 20 weight percent of a monomer mixture comprising 100 to about 60 percent of a $C_{8-12}$ vinyl aromatic monomer which may be unsubstituted or substituted by a $C_{1-4}$ alkyl radical or a bromine or chlorine atom; from 0 to 40 weight percent of a $C_{1-2}$ alkyl ester of acrylic or methacrylic acid;
  from about 0.5 to 10 weight percent of at least one $C_{3-6}$ ethylenically unsaturated carboxylic acid; and
  from about 0.1 to about 5 weight percent of an N-$C_{1-4}$ alkylol derivative of an amide of a $C_{3-6}$ ethylenically unsaturated carboxylic acid; per 100 parts by dry weight of said polymer from about 40 to 100 parts by weight of a particulate mineral filler, an effective amount of a gelling agent, and optionally a cure paste.

DETAILED DESCRIPTION OF THE INVENTION

The present invention also provides a consolidated sheet material prepared by the above process.

The latices useful in accordance with the present invention are characterized as nitrile rubber latices. They are particularly useful where the consolidated substrate may be exposed to oil or chemicals.

The nitrile polymers in accordance with the present invention preferably comprise from about 10 to 45, preferably from about 30 to 40, weight percent of a $C_{3-6}$ alkenyl nitrile; from about 36 to about 85, preferably from about 40 to 55, weight percent of a $C_{4-6}$ conjugated diolefin; from about 5 to 20, preferably from about 5 to 15, weight percent of a monomer mixture comprising from 100 to about 60, preferably more than 80 percent and most preferably 100 percent, of a $C_{8-12}$ vinyl aromatic monomer which may be unsubstituted or substituted by a $C_{1-4}$ alkyl radical or a chlorine or bromine atom, and the balance a $C_{1-2}$ alkyl ester of acrylic or methacrylic acid; from about 0.5 to about 10, preferably from about 2 to 6, weight percent of a $C_{3-6}$ ethylenically unsaturated carboxylic acid; and from about 0.1 to about 5, preferably from about 0.5 to 2, weight percent of an N-$C_{1-4}$ alkylol derivative of an amide of a $C_{3-6}$ ethylenically unsaturated carboxylic acid.

Suitable $C_{3-6}$ alkenyl nitriles include acrylonitrile and methacrylonitrile.

Suitable $C_{4-6}$ conjugated diolefins include acyclic diolefins such as butadiene and isoprene.

Suitable $C_{8-12}$ vinyl aromatic monomers include styrene which may be substituted by methyl, ethyl, propyl, and butyl radicals such as alpha methyl styrene. The sytrene monomer may optionally be substituted by a bromine or chlorine atom.

When present, the acrylate monomers may be selected from methyl acrylate, methyl methacrylate, ethyl acrylate and ethyl methacrylate.

Carboxylic acid monomers which may be used in accordance with the present invention include acrylic acid, methacrylic acid, maleic acid and itaconic acid.

The most commonly available N-alkylol derivatives of an amide of a $C_{3-6}$ ethylenically unsaturated carboxylic acid which may be used in accordance with the present invention are N-methylol acrylamide and N-ethylol acrylamide.

Processes for preparing latices of these polymers are well known in the art. A batch polymerization process is disclosed in U.S. Pat. No. 3,344,103 issued Sept. 26, 1967 to B. F. Goodrich. A semi continuous process for preparing such latices is disclosed in Chemical Abstracts CA 96:124630g and CA 98:162209g. These are abstracts of East German Pat. Nos. 151,456 and 157,193 published Oct. 21, 1981 and Oct. 20, 1982 in the name of VEB Chemische Werke Buna.

As the latex is to be gelled the emulsifier should be capable of being gelled under the condition of use. Long chain fatty acid soaps are suitable with amine-divalent metal oxide type gelling systems, such as ammonium acetate zinc oxide. Sulphonate surfactants are particularly useful with silicone polyether gelling agents. Suitable sulphonate surfactants and silicone ethers are disclosed in U.S. Pat. No. 3,702,315 issued Nov. 7, 1972 to B. F. Goodrich. Other types of sulphonate surfactant such as $C_{10-20}$ alkyl sulfonates are also suitable. Generally the emulsifier level should be less than about 2 percent.

The monomeric ingredients are polymerized to provide a latex with a polymeric solids content typically from about 40 to about 55 percent by weight. Through conventional procedures such as agglomeration and concentration the solids level may be raised up to about 65 percent by weight.

The latex is then compounded. The filler is added in an amount from about 40 to 100, preferably 50 to 70 parts by weight per 100 parts by weight of polymer in the latex. The filler should be added to the latex in accordance with good compounding procedure. When the filler is added as a slurry or suspension a surfactant compatible with the surfactant in the latex should be used. Preferably the surfactant should be of a type and used amount not to interfere with the gelling systems. Due to cost considerations the filler is generally a particulate inorganic material. Suitable fillers include calcium carbonate, clay, silicates, and other mineral fillers typically used with latex compounds.

These types of systems are preferred as they reduce the tendency of stratification in the web due to premature gellation and to binder migration either to the surface or interior of the web. Heat sensitive gelling agents cause gelling of the latex over a relatively narrow temperature range. It is desirable to use low temperature gelling agents which will cause gellation under relatively mild conditions at temperatures from about 40° to 80 C., preferably from about 45° to 60° C.

There are a number of different heat sensitive gel systems known in the art. The amine-divalent metal oxide gel systems, such as amine or ammonium ion releasing compound and zinc oxide. Typically these gelling agents cause gelling in the range of from 25° to 40° C. Usually the amine generating agent should be used to provide ammonia in an amount from about 0.1 to 4, preferably about 0.3 to about 2 parts by weight per 100 parts by weight of polymer in the latex. The divalent metal should be present in a minimum effective amount generally from about 0.5 to 20, preferably about 2 to about 10 parts by weight per 100 parts of polymer. These systems require that the compound have a pH from about 10 to 11.

Chemicals to broaden the tolerance of the compound to the amine metal oxide system may be added to the compound. Typically these are compounds such as ammonium or amine sulphamates or ammonium or amine sulphates. These compounds are typically used in amounts up to about 30, preferably less than about 6 parts by weight per 100 parts by weight of polymer in the latex.

A preferred class of heat sensitive gelling agents are the organic siloxane compounds.

Suitable compounds have the formula

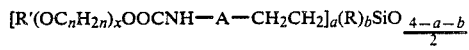

wherein R is an organic radical; R' is a $C_{1-7}$ alkyl radical or an aryl radical; A is a divalent hydrocarbon containing up to 7 hydrocarbons; a is from 0.05 to 1.00 inclusive, b is from 1.12 to 2.25 inclusive; and a+b is from 2.02 to 2.40; n is from 2 to 4 and x is at least 5.

A particularly useful starting siloxane has the formula

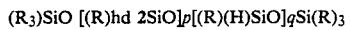

wherein R is as previously defined; p has an average value from 0 to 45, q has a value from 1 to 48 and the sum of p+q is equal to from 3 to 48 and the sum of the silicon bonded R groups and silicon bonded hydrogen is from 2.04 to 2.40 per silicon atom. Preferably R is methyl.

These agents are described in above noted U.S. Pat. Nos. 3,702,315 and in 3,483,240 issued Dec. 9, 1969 to the General Electric Company. The organo siloxane is used in an amount from about 0.01 to 1.0, preferably from about 0.01 to about 0.5 parts by weight per 100 parts by weight of polymer.

These siloxane compounds will cause the latex compound to gel at a temperature from about 45° to 55° C.

These compounds are particularly useful with the sulphonate surfactants. Particularly useful are the alkane surfactants containing from about 10 to 20 carbon atoms, preferably from about 10 to 14 carbon atoms.

The gelling system may also comprise an amine or ammonium ion releasing agent in conjunction with a non ionic surfactant. Such non ionic surfactants are the reaction of a long chain fatty alcohol having from about 15 to 20 carbonations with the condensation product of a lower alkylene oxide having from about 20 to 40, preferably from 20 to 30, alkylene oxide units. Preferably the alkylene oxide is ethylene oxide. The amine compound and the surfactant are added to the latex in a total amount of about 5 to 10 parts by weight per 100 parts by weight of polymer in the latex. The ratio of amine releasing compound to non ionic surfactant is from about 1:1 to about 1:3. Suitable amine release compounds include ammonium salts such as ammonium chloride; organic amines, amine sulphates and amine sulphamates. Many non ionic compounds which are the adduct of a long chain fatty alcohol and the condensation product of a lower alkylene oxide are commercially available. Such products include Lutensol AT 25 (Trademark of BASF).

The gelling agent may also be a compound which has a lower solubility in the latex compound at an elevated temperature than at lower temperatures suitable compounds include polyethers as described in High Polymer Latices by D. C. Blackley, Maclaren and Sons, London, 1966 at Vol. 1 pages 43 and 44. The polyethers are generally used in an amount from about 0.5 to 5 percent by weight based on the weight of the polymer.

Polymers of lower alkylene glycols may also be used as a heat sensitive gelling agent. These compounds may be homopolymers or copolymers of $C_{2-3}$ alkylene glycols. Preferably the polymers are functional derivatives of such poly glycols such as those sold by BASF under the trade mark BASENSOL. These poly alkylene glycols are typically used in an amount from about 3 to about 6 percent by weight based on the weight of the polymer.

The latex compound does not need to contain a vulcanization paste. The latices of the present invention are self curing, when heated to from about 120° to 180° C., typically about 150° C., for from about 5 to about 20 minutes, typically about 10 minutes.

The latex compound may contain other usual ingredients such as antioxidants and pigments in amounts generally used in the industry.

The web may be a web of synthetic or natural fibre or a mixture of both. Generally blends of synthetic fibers such as polyester, polyamide, or polyolefin with cellulosic fibers either natural or regenerated may be used. The web is a non woven and may have a weight up to about 2000 grams per square meter. Generally, the webs have a weight from about 800 to about 1500 grams per square meter. To obtain the required density, these webs are usually needled and shrunk.

Typically the web passes through a bath to saturate it. The pick up of the web may be from 30 to 150 typically from about 50 to about 120 weight percent preferably from about 70 to 100 weight percent, based on the dry weight of the web. The impregnated web is then heated, to the gel temperature, typically by infra red heaters. The gelled web then passes through a dryer or oven at a temperature of from about 120° to 180° C. for a period of time sufficient to dry and cure the web. Generally the time is from about 5 to 20 minutes depending on the air flow in the oven and the base weight of the web. The consolidated web may then be treated in the usual manner.

EXAMPLES

The following examples are intended to illustrate the invention and are not intended to limit it. In the examples parts refers to parts by dry weights unless otherwise specified.

The latex was prepared from a total monomer composition consisting of 50 parts of butadiene, 9 parts of styrene; 35 parts of acrylonitrile; 5 parts of a $C_{3-6}$ ethylenically unsaturated acid and 1 part of N-methylol acrylamide by a semi continuous method.

A film of the latex per se and latex plus 60 parts filler per 100 parts polymer was cast and dried at 70° C. for 2 hours and then cured at 130° C. for 15 minutes. Films of POLYSAR* PL5372 and PL5361 (Trademark) latex used for web impregnation per se, contaning 8.5 parts by weight of a sulphur cure paste per 100 parts of polymer, and containing 8.5 parts of a sulphur cure paste and 60 parts of the same filler, per 100 parts of polymer were also cast and dried and cured under the same conditions. POLYSAR Latex 5372 is competitive with latices sold for web impregnation or saturation in the manufacture of synthetic leather. Competitive latices include PERBUNAN* N3415M and PERBUNAN N Latex T. The tensile strength of the film at various degrees of elongation was then measured in $kg/cm^2$. The tensile and the percent elongation at break was also recorded. The results are set forth in Table I.

* Trademark

TABLE I

| Elongation | 10% | 30% | 50% | 100% | 200% | 300% | Tensile/Elongation |
|---|---|---|---|---|---|---|---|
| Sample Latex per se | 4 | 7 | 9 | 11 | 13 | 16 | 93/780 |
| Sample Latex plus 60 parts filler | 7 | 13 | 15 | 17 | 19 | 21 | 88/775 |
| PL 5372 (no cure paste) | 6 | 8 | 10 | 11 | 11 | — | 11/205 |
| PL 5372 plus 8.5 sulphur based cure paste | 6 | 10 | 12 | 14 | 16 | 18 | 62/290 |
| PL 5372 (8.5 sulphur based cure paste + 60 parts filler) | 9 | 15 | 16 | 17 | 19 | 22 | 38/520 |
| PL 5361 (no cure paste) | 4 | 6 | 7 | 8 | 8 | 9 | 12/703 |
| PL 5361 (8.5 parts sulpur based cure paste) | 6 | 9 | 11 | 14 | 17 | 21 | 27/410 |
| PL 5361 (8.5 parts sulphur based cure paste + 60 parts filler) | 10 | 10 | 11 | 11 | 11 | 13 | 18/468 |

These results show that the latices of the present invention are self curing, and give comparable tensile strengths in the absence of a cure paste with the latices currently used. The elimination of the need for a cure paste is an advantage to the user of the latex as it does away with compounding reducing the cost of equipment and labour associated with compounding.

The latex of the present invention and comparative latex PL 5372 were compounded as indicated and a mixed polyester, polyamide, rayon (40/40/20 by weight) web having a dry weight of 100 g per square meter was impregnated with the compound. The impregnated web was then gelled, dried, cured and split to about 1 mm thickness and the strength and elongation of the web at break was recorded. The results are set forth in Table II.

TABLE II

| Ingredient | I | II | III | IV | V | VI | VII | VIII |
|---|---|---|---|---|---|---|---|---|
| PL 5372 | 100 | 100 | 100 | 100 | 100 | | | |

TABLE II-continued

| Ingredient | I | II | III | IV | V | VI | VII | VIII |
|---|---|---|---|---|---|---|---|---|
| Latex of Invention | | | | | | 100 | 100 | 100 |
| Cure Paste | 8.5 | 8.5 | — | — | 8.5 | — | — | — |
| Calcium Carbonate | — | 60 | — | 60 | 100 | 60 | 60 | 100 |
| Silicon Gelling Agent (10% active-wet) | 0.15 | 0.3 | 0.5 | 1 | 1.0 | 0.75 | 0.375 | 0.75 |
| Web Pick up % (dry compound on the base weight of the web) | 99 | 115 | 101 | 113 | 70 | 106 | 130 | 70 |
| Strength (Kg/5 cm) longitudinal direction | 60 | 44 | 41 | 44.5 | 39 | 55 | 57 | 60 |
| Elongation (%) | 67 | 60 | 105 | 98 | 60 | 67 | 64 | 46 |

This test shows that the web of the present invention, containing 100 parts of filler per 100 of polymer is comparable to the webs of the prior art with no filler. As soon as filler is added to or the cure paste omitted from the compounds of the prior art the strength of the web deteriorates by about 30%.

To test abrasion resistance the comparative latex was compounded with 8.5 parts of a cure paste and with 60 parts of filler per 100 parts of polymer. Two different samples of the latex of the invention were compounded in a similar manner with and without filler, in the presence and absence of cure paste. Webs were impregnated with these compounds and the web was then tested for abrasion resistance using the Veslic Test (Swiss association of Leather Industry Chemists) in which higher numbers give a poorer result. Additionally samples of web from Trial V and Trial VIII in Table II were also tested using the Veslic Test.

In the test a sample of synthetic leather is placed on the apparatus. A 500 gm weight is placed on a plastic foot having a pedestal extending to the surface of the synthetic leather. The pedestal has a base 15 mm long by 3 mm wide. The foot is rubbed over the leather in the longitudinal direction of the pedestal for 5, 10, 20 and 40 cycles. The results for 40 cycles are reported in Table III. The synthetic leather samples were subjectively compared for the relative extent of abrasion, 5 being the worst and 1 being the best. The results are set forth in Table III below.

TABLE III

| Web | | Abrasion |
|---|---|---|
| PL 5372 + cure paste | | 2 |
| PL 5372 + cure paste + filler (60 parts per 100 polymer) | | 5 |
| Latex of the present invention: | 1st trial | 5 |
| | 2nd trial | 5 |
| Latex of the present invention + cure paste: | 1st trial | 1 |
| | 2nd trial | 1 |
| Latex of the present invention + 60 parts filler: | 1st trial | 2 |
| | 2nd trial | 2 |
| Latex of the present invention + 60 parts filler + cure paste: | 1st trial | 1 |
| | 2nd trial | 1 |
| Sample V Table II | | ½ |
| Sample VIII Table II | | 4 |

In industrial application PL 5372 is always used in conjunction with a cure paste.

What is claimed is:

1. A method for manufacturing a filled consolidated sheet material comprising impregnating a non-woven fibrous web with from 30 to 150 weight percent of the web with a compound comprising per 100 parts by dry weight of a latex of a polymer formed by polymerizing a monomeric mixture consisting essentially of:
   (a) from 10 to 45 weight percent of a $C_{3-6}$ alkenyl nitrile;
   (b) from 36 to 85 weight percent of a $C_{4-6}$ conjugated diolefin;
   (c) from 5 to 20 weight percent of a monomeric mixture comprising
      (i) from 100 to 60 weight percent of a $C_{8-12}$ vinyl aromatic monomer which may be unsubstituted or substituted by a $C_{1-4}$ alkyl radial or a chlorine atom; and
      (ii) from 0 to 40 weight percent of a $C_{1-2}$ alkyl ester of acrylic or methacrylic acid;
   (d) from 0.5 to 10 weight percent of at least one ethylenically unsaturated carboxylic acid; and
   (e) from 0.1 to 5 weight percent of an $N-C_{1-4}$ alkylol derivative of an amide of a $C_{3-6}$ ethylenically unsaturated carboxylic acid;
   from 40 to 100 parts by weight of particulate mineral filler;
   a gelling system selected from the group consisting of:
   (i) 0.01 to 1 parts by weight of silicon ether of the formula

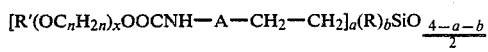

$$[R'(OC_nH_{2n})_xOOCNH-A-CH_2-CH_2]_a(R)_bSiO_{\frac{4-a-b}{2}}$$

wherein
   R is a methyl radial
   R is a $C_{1-7}$ alkyl radical
   A is a $C_{1-7}$ divalent hydrocarbon radical;
   a is from 0.05 to 1.00 inclusive;
   b is from 1.12 to 2.25 inclusive;
   a & b is from 2.02 to 2.40;
   n is from 2 to 4; and
   x is at least 5; and
   (ii) 5 to 10 parts by weight of a 1:1 to 1:3 mixture comprising
      (a) an amine releasing agent selected from the group consisting of ammonium chloride, amine sulfates, amine sulfamates, and organic amines; and
      (b) the condensation product of a lower alkylene oxide having from 20 to 40 alkylene oxide units and a $C_{15-20}$ long chain fatty acid;
   heating said impregnated web at a temperature from 40° to 80° C. to gel said compound; and
   heating said web containing said gelled compound at a temperature from 120° to 180° C. for from 5 to 20 minutes to cure said compound.

2. A method according to claim 1 wherein the polymer comprises:
   from about 30 to 40 weight percent of a $C_{3-6}$ alkenyl nitrile;
   from about 40 to about 55 weight percent of $C_{4-6}$ conjugated diolefin;

from about 5 to about 15 weight percent of a $C_{8-12}$ vinyl aromatic monomer which may be unsubstituted or substituted by a $C_{1-4}$ alkyl radical or a chlorine or bromine atom;

from about 2 to about 6 weight percent of at least one $C_{3-6}$ ethylenically unsaturated carboxylic acid; and from about 0.5 to about 2 weight percent of an N-$C_{1-4}$ alkylol derivative of acrylamide or meth acrylamide.

3. A process according to claim 2 wherein said particulate mineral filler is present in an amount from 50 to 70 parts by weight per 100 parts by weight of said polymer.

4. A process according to claim 3 wherein
said alkenyl nitrile is selected from the group consisting of acrylonitrile and methacrylonitrile;
said $C_{4-6}$ conjugated diolefin is selected from the group consisting of butadiene and isoprene
said vinyl aromatic monomer is styrene
said $C_{3-6}$ ethylenically unsaturated carboxylic acid is selected from the group consisting of acrylic acid, methacrylic acid, and itaconic acid; and
said amide is selected from the group consisting of N-methylol acrylamide and N-methloyl meth acrylamide.

5. A process according to claim 4 wherein said gelling system is a silicone ether.

6. A method according to claim 4 wherein said gelling agent is present in an amount from about 5 to 10 parts by weight per 100 parts by weight of polymer and comprises a mixture of an amine or ammonium generating compound and an emulsifier which is an adduct of a $C_{15-20}$ saturated alcohol and the condensation product of about 20–30 moles of ethylene oxide in a weight ratio of from 1:1 to 1:3.

7. A consolidated sheet material prepared according to claim 2.

* * * * *